（12）United States Patent
Abadi et al.

(10) Patent No.: US 9,424,006 B2
(45) Date of Patent: Aug. 23, 2016

(54) EXECUTION OPTIMIZATION OF MOBILE APPLICATIONS

(71) Applicant: International Business Machines Corporation, Armonk, NY (US)

(72) Inventors: Aharon Abadi, Petach Tikva (IL); Moria Abadi, Petach Tikva (IL); Idan Ben-Harrush, Givat Elah (IL)

(73) Assignee: International Business Machines Corporation., Armonk, NY (US)

( * ) Notice: Subject to any disclaimer, the term of this patent is extended or adjusted under 35 U.S.C. 154(b) by 0 days.

(21) Appl. No.: 14/582,219

(22) Filed: Dec. 24, 2014

(65) Prior Publication Data
US 2016/0188304 A1    Jun. 30, 2016

(51) Int. Cl.
*G06F 9/44*    (2006.01)
*G06F 9/45*    (2006.01)

(52) U.S. Cl.
CPC . *G06F 8/41* (2013.01); *G06F 8/311* (2013.01)

(58) Field of Classification Search
None
See application file for complete search history.

(56) References Cited

U.S. PATENT DOCUMENTS

| | | |
|---|---|---|
| 8,346,889 B1 | 1/2013 | Chiu et al. |
| 8,458,585 B1 | 6/2013 | Grieve et al. |
| 8,539,038 B2 | 9/2013 | Jones et al. |
| 2013/0305228 A1* | 11/2013 | Black ............... G06F 11/3688 717/131 |

FOREIGN PATENT DOCUMENTS

EP     2521033     11/2012

OTHER PUBLICATIONS

"Reducing Your App's Loading Time", Can be found at: http://msdn.microsoft.com/en-us/library/windows/apps/hh849088.aspx, 2014.
Disclosed Anonymously., "A method to cache code annotation information to speed up application startup time", An IP.com Prior Art Database Technical Disclosure, Jan. 28, 2011.

* cited by examiner

*Primary Examiner* — Qamrun Nahar (57) ABSTRACT

According to an aspect of some embodiments of the present invention there is provided a method for changing a program code to decrease execution time. The method comprises an action of receiving a program code, comprising function calls, with an entry and a target function. The method comprises analyzing the function calls between the entry function and the target function. A first program code is generated, comprising some of the function calls executed before the target function. A second program code is generated, comprising some of the function calls executed after the target function. The function calls executed before the target function are replaced with the first program code. The function calls executed after the target function are removed. The second program code is added to the program code to execute after the target function as a background process.

20 Claims, 11 Drawing Sheets

```
 1 | function f(t){
 2 | function h(t){    302
 3 |         g());
 4 |     }
 5 |     function g(t){
 6 |         alert(x);
 7 |     }
 8 |     if(t>1){
 9 |         x=3;
10 |         h();
11 |     }else{
12 |         h();
13 |         x=2;
14 |     }
15 |     g();  304
16 |     h();
17 | }
18 | x=1;
19 | f(1);    301
20 | f1();
21 | function f1(){   303
22 |     alert(x);
23 | }
```

FIG. 3

```
25 | function wlCommonInit() {    401
26 |     // special case for Windows Phone 8 only.
27 |     if(WL.Client.getEnvironment() == WL.Environment.WINDOWS_PHONE_8) {
28 |         pagePath = "www/default/";
29 |     }
30 |
31 |     loadNextPage("pages/MainPage.html")
32 |
33 |     //initialize JSONStore for storing predefined contexts
34 |     initStore();
35 |     initSettings();
36 |     initLogger();
37 |
38 |     // keep running while in background on Android; will show a notification
39 |     WL.App.setKeepAliveInBackground(true);
40 |
41 |     keepTracking();    402
42 | }
43 |
```

FIG. 4A

```
44   function keepTracking(){ 402
45       var geoData = {};
46       var geoTriggerExistance = false;
47       var wifiData = {};
48       var wifiTriggerExistance = false;
49
50       /** triggers initialization **/
51       for(var j=0; j<contextConfigs.length; j++) {
52           contextConfig = contextConfigs[j];
53
54           // use GPS to get the user's location
55           // alerting trigger for GPS
56           if(contextConfig.geo) {
57               geoTriggerExistance = true;
58               for(var i=0; i<contextConfigs.geo.length; i++) {   402A
59                   geoData["EnterArea"+j+i] = createTriggerData(contextConfig.geo[i]...
60                   geoData["ExitArea"+j+i] = createTriggerData(contextConfig.geo[i]...
61                                                              402A
62               }
63               // TODO: learning trigger for GPS
64
65           // use WiFi to get the user's location
66           // TODO: altering trigger for WIFI
67
68           // learning trigger for WIFI
69           if(contextConfig.learning && contextConfig.type == "WiFi") {   402A
70               wifiTriggerExistance = true;
71               wifiData["ConnectWifiL"+contextConfig.id] = createTriggerData( ...
72               wifiData["DisconnectWifiL"+contextConfig.id] = createTriggerData( ...
73           }                                                  402A
74       }
```

```
<script type="text/javascript" src="js/utils.js"></script>                    501
<script type="text/javascript" src="js/CommonControls.js"></script>
<script type="text/javascript" src="
                                    "></script>
```

```
<script type="text/javascript">                                               502
    dojoConfig = {
        parseOnLoad: true,
        isDebug: false,
        async: true,
        baseUrl: "js",
        packages:[
                { "name": "dojo", "location": "lib/dojo/dojo" },
                { "name": "dijit", "location": "lib/dojo/dijit" },
                { "name": "dojox", "location": "lib/dojo/dojox" },
                { "name": "mysurance", "location" : "mysurance" }
        ]
    };
</script>
```

```
<script type="text/javascript" src="js/lib/dojo/dojo/dojo.js"></script>       503
<script src="js/mysurance.js"></script>
<script src="js/messages.js"></script>
```

```
<script src="js/initOptions.js"></script>                                     504
<script src="js/PushAppRealmChallengeHandler.js"></script>
```

FIG. 5A

```
<script type="text/javascript">
    function isPhone(){
        return window.innerWidth < 600 || window.innerHeight < 600;
    }
    function initLoginScreen(){
        var holderHeight = window.innerHeight > window.innerWidth ? window.innerHeight:window.innerWidth;
        document.getElementById("heightHolder").style.height = (holderHeight/6) + "px";
        if(((isPhone())&&(0 == window.orientation))|((!isPhone())&&(0 != window.orientation)&&(180 != window.orientation)&&(/android/i.test(navigator.userAgent)))|((!isPhone())&&(90 != window.orientation)&&(-90 != window.orientation)&&(/ipad|iphone|mac/i.test(navigator.userAgent)))){
            document.getElementById("loginForm").style.height = (window.innerHeight > window.innerWidth ? window.innerHeight:window.innerWidth) + "px";
            document.getElementById("portraitPic").style.display="";
            document.getElementById("landscapePic").style.display="none";
        }else{
            document.getElementById("loginForm").style.height = (window.innerHeight < window.innerWidth ? window.innerHeight:window.innerWidth) + "px";
            document.getElementById("portraitPic").style.display="none";
            document.getElementById("landscapePic").style.display="";
        }
    }
    initLoginScreen();
    window.onorientationchange=function(){
        initLoginScreen();
    }
</script>
```

```
<script src="js/initOptions.js"></script>                                    504
<script src="js/PushAppRealmChallengeHandler.js"></script>
```

```
<script type="text/javascript">                                              506
        document.onload=function(){ addScript("text/javascript","js/utils.js");                  501
                addScript("text/javascript","js/CommonControls.js");
                addScript("text/javascript", "
                                ");

addScript("text/javascript","js/lib/dojo/dojo/dojo.js");     503
                addScript("text/javascript","js/mysurance.js");
                addScript("text/javascript","js/messages.js");

//addScript("text/javascript","js/initOptions.js");
                //addScript("text/javascript","js/PushAppRealmChallengeHandler.js");
        } function addScript(type,src){
                var s=document.createElement('script');
                s.setAttribute("type",type);
                s.setAttribute("src", src);
        }
</script>
```

FIG. 5C onGetFeedsSuccess            601
onGetFeedsFail
displayItems
displayPubDate
afterDisplayItems
wlCommonInit():
afterInitEnv
afterSelectTab
displayAboutTab
displayFeedDescriptionTab
displayFeedDescriptionTabEnvBeginning
displayFeedsTab
loadFeeds
initializeBusy
wlCommonInit
selectTab
setObservers
beforeInitEnv
showOnlyOneTab

FIG. 6 onGetFeedsSuccess   701
onGetFeedsFail
displayItems
displayPubDate
afterDisplayItems

FIG. 7

EXECUTION OPTIMIZATION OF MOBILE APPLICATIONS

BACKGROUND

The present invention, in some embodiments thereof, relates to mobile applications and, more specifically, but not exclusively, to execution optimization in mobile hybrid applications.

Hybrid mobile applications are applications that run on a mobile device and use web language technologies locally on the device to format the content, such as using hypertext markup languages (HTML), context style-sheet languages (CSS), and/or the like, and/or run applications with client-side scripts, such as using JavaScript, Python, and/or the like. Using the device's browser engine, such as Blink, Gecko, Trident, and/or the like, the hybrid application accesses code and/or resources previously developed and stored in modules and/or libraries to reduce the development time of the hybrid application. Typically, these modules contain large amounts of code together designed to provide a myriad of functionalities, and when imported to the native application are loaded as a collection.

SUMMARY

According to an aspect of some embodiments of the present invention there is provided a method for changing a program code to decrease execution time. The method comprises an action of receiving a program code, wherein the program code comprises two or more function calls, wherein one of the function calls is an entry function, wherein one of the function calls is a target function, and wherein an execution time between the entry function and the target function is to be decreased. The method comprises an action of analyzing the function calls between the entry function and the target function. The method comprises an action of generating a first program code comprising some of the function calls executed before the target function. The method comprises an action of generating a second program code comprising some of the function calls executed after the target function. The method comprises an action of replacing the function calls executed before the target function with the first program code. The method comprises an action of removing the function calls executed after the target function. The method comprises an action of adding the second program code to the program code at a location within the program code configured to execute the second program code after the target function as a background process.

Optionally, the analysis is performed by generating a call graph of the function calls, wherein the call graph comprises two or more nodes, one for each of the function calls.

Optionally, one of the nodes is an entry mode representing the entry function, and one of the nodes is a target node representing the target function, and a path between the entry node and the target node is analyzed to select some of the nodes representing some of the function calls that are required for execution of a target function.

Optionally, the analysis of the path and a branch of the call graph starting at the target node are used to generate the first and second program code.

Optionally, the path and the branch are determined by a graph theory reachability of the call graph between the entry node and the target node.

Optionally, the target function is a function adapted to send one or more output value to a user interface.

Optionally, the one or more output value is adapted to display a user interaction screen.

Optionally, the target function is a function adapted to receive one or more input value from a user interface.

Optionally, some of the function calls are located in one or more external library comprising two or more library function calls, wherein the one or more external library is an external file to the program code.

Optionally, some of the function calls are located in one or more external program code file different from the program code, herein the external program code file is located at a separate file storage location from the program file.

Optionally, the one or more external program code file is modified to generate a first external program code file containing code executed before the target function and a second external program code file containing code executed after the target function, wherein the first program code is adapted to import the first external program code file from the separate file storage location before the target function is executed and the second program code is adapted to import the second external program code file from the separate file storage location after the target function is executed.

Optionally, the program code, the first program code, and the second program code are a compiled language code and compiled to produce the application prior to execution on a mobile device by a user.

Optionally, the program code, the first program code, and the second program code are one or more programming language from the group of a script language code, a markup language code, an interpreted language code and a style sheet language code.

Optionally, the script language code is a JavaScript language code.

Optionally, the markup language code is a hypertext markup language code.

Optionally, the one or more programming language is two or more computer programming languages.

Optionally, a computer readable medium comprising computer executable instructions adapted to perform the method of claim 1.

According to an aspect of some embodiments of the present invention there is provided a computer program product for changing a program code to decrease execution time. The computer program product comprises a computer readable storage medium having stored thereon program instructions executable by a computerized system. A first program instructions cause the computerized system to receive a program code, wherein the program code comprises two or more function calls, wherein one of the function calls is an entry function, wherein one of the function calls is a target function, and wherein an execution time between the entry function and the target function is to be decreased. A second program instructions cause the computerized system to analyze the function calls between the entry function and the target function. A third program instructions cause the computerized system to generate a program code comprising some of the function calls executed before the target function. A fourth program instructions cause the computerized system to generate a second program code comprising some of the function calls executed after the target function. A fifth program instructions cause the computerized system to replace the function calls executed before the target function with the first program code. A sixth program instructions cause the computerized system to remove the function calls executed after the target function. A seventh program instructions cause the computerized system to add the second program code to the program code at a location within the program code configured to execute the second program code after the target function as a background process.

According to an aspect of some embodiments of the present invention there is provided a system for changing a program code to improve execution time. The system comprises a user interface to control the operation of one or more computerized device of the system. The system comprises a program code interface to transfer a program code to one or more processing unit. The system comprises one or more processing unit configured with software modules. The software modules comprise a code analysis module configured to receive the program code via the program code interface, wherein the program code comprises two or more function calls, wherein the function calls comprise an entry function and a target function, and wherein the function calls are analyzed between the entry function and the target function. The software modules comprise a code generation module configured to generate a first program code comprising some of the function calls executed before the target function and configured to generate a second program code comprising some of the function calls executed after the target function. The software modules comprise a code modification module configured modify the function calls with the first and second program code, wherein the modification is adapted to execute the second program code in a background process after the target function.

Optionally, the program code interface is a network interface electronically attached to the one or more processing unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

In mobile applications, execution time of the application, such as in a screen load time and, in particular application (app) startup time, is extremely important for a good user experience. For example, according to Localytics, 26% of apps downloaded in 2010 were used only once because of negative user experience. Execution time of the application may also be important for service applications that provide code, data, and/or resources to other applications, such as code for formatting a screen, disk space, volatile memory space, global positioning system data, camera images, and the like. When developing mobile applications, software developers typically expect the same performance on mobile platforms as with desktop computers, even though the hardware is slower. Testing of mobile applications is typically performed on new mobile devices that have state-of-the-art hardware and less computational overhead from multiple app installations, making the real world load times on user mobile devices not available to developers.

Especially important is the app startup, which is critical to user experience, and should always be a primary concern during software development. For example, when an application's user interaction screen is delayed, a user may become frustrated and never actually wait long enough to evaluate the application itself. In another example, a user has been using an application with a long startup time for a few weeks, decides that the application is not worth using because of the long startup time, and uninstalls the application to save memory space. Many of the current application code and/or resources, such as code and/or resources located in HTML, CSS, and JavaScript modules, are loaded during the startup phase or when entering a screen during the screen load. It is almost impossible to distinguish manually between code and/or resources that are needed during startup or loading of the user interaction screen and code and/or resources that are needed after. There are no known automated algorithms for identifying code and/or resources that are not needed on startup, and that change the application code accordingly.

According to some embodiments of the present invention there is provided methods and systems, for automatically analyzing the application function call flow and/or functions calls to external code modules for identifying the code and software resources that are needed during the loading of a user interaction screen. For example, loading a user interaction screen is the startup and display of the first user interaction screen displayed when the application is started. As used herein, the term screen load, or more concisely load, refers to the execution time of the function calls that display a user interaction screen, such as a login screen. The methods and systems split automatically the program code function calls into two groups: a startup group of code needed for startup and another group of code for loading in the background after startup. The startup code may be executed before the display of the user interaction screen, and the other function calls may be loaded after the user interaction screen in a background process while waiting for user input. As used herein, the term startup code may be used for the code and/or resources needed to load the user interaction screen, and the term after-load code may be used for the code and/or resources not needed to load the user interaction screen that are loaded in the background after the user interaction screen is displayed.

Optionally, the code and/or resources are imbedded in the application program code. For example, inline script functions to allocate memory for databases.

Optionally, the code and/or resources are located in modules external to the application program code. For example, functions to define default configuration settings are located in a code module for a platform of code and/or resources.

Optionally, the code and/or resources are located in a library file external to the application program code. For example, functions to define matrix operations of an image processing application are located in a dynamic link library.

Optionally, the method is implemented by a developer and the load time optimized application is distributed to users. For example, a developer is developing a mobile hybrid application using the HTML and JavaScript computer languages, and after functional development is complete, the application is optimized on a server. For example, the developer uses a local server to optimize the application. For example, the developer uses a server offering a service to optimize the application.

Optionally, the method is implemented by a user on a mobile device to optimize the load time of an application. For example, legacy mobile applications developed in the HTML, CSS and JavaScript computer languages are optimized by a user on the user's mobile device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
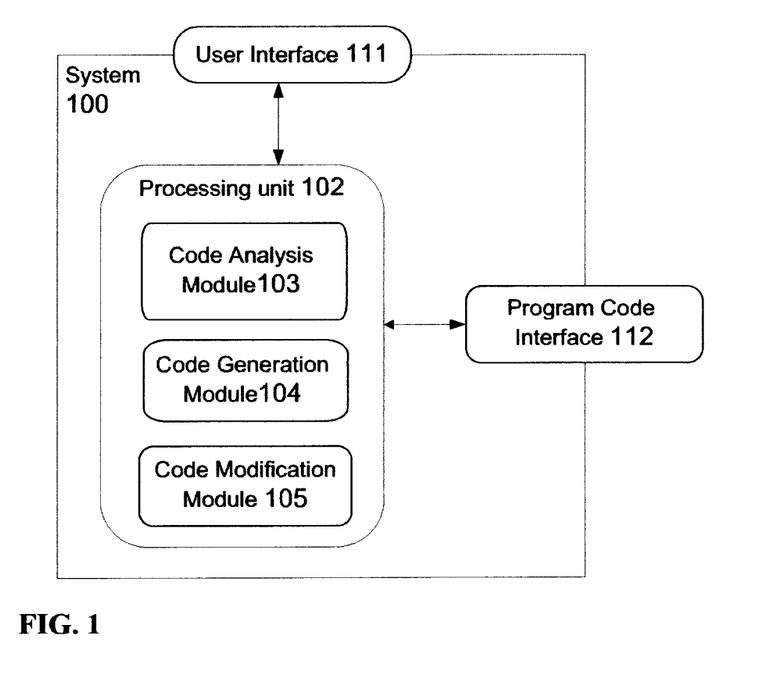
FIG. 1 is a schematic illustration of a computerized system for analyzing and modifying a program code to decrease application execution time, according to some embodiments of the invention.

Reference is now made to FIG. 1, which is a schematic illustration of a computerized system for analyzing and modifying a program code to decrease application execution time, according to some embodiments of the invention. The computerized system 100 comprises a user interface 111, a program code interface 112, and a processing unit 102 with processor memory integrated code modules. The computerized system 100 may be incorporated in server on a network, a personal computer, a mobile device, and the like. A software developer, such as a mobile hybrid application developer, utilizes the user interface 111 for directing the system to transfer a program code using the program code interface 112 to the processing unit 102, and perform the load time optimization for the application. Optionally, the operation and/or output of the computerized system 100 is offered to the developer as a service. When the processing unit 102 receives the program code, the processing unit activates the code analysis module 103, which interprets the code and determines the internal and/or external file code and/or resources that the application loads at run time, such as using a call graph. The code analysis module 103 also determines the user interaction screen (UIS) whose load time needs to be optimized, and the internal and/or external functions that load the code and/or resources directly needed by the UIS. Next, code is generated by the code generation module 104 that instructs the application to perform the loading of code and/or resources not needed by the UIS in the background after the UIS is displayed to the user, and the application is waiting for input from the user through the user interface 111. Finally, the code modification module 105 modifies the program code so that the startup code is imported and/or performed immediately upon start of the application, and the after-load resources and/or functions are imported and/or performed in the background after the application is waiting for input from the user. As used herein, the term top level resources and/or functions mean the respective resources and/or functions that are executed directly from the program code or from included external files, and not from secondary resources and/or functions that are not available for analysis. The new program code with optimized loading time of the UIS is sent back to an internal and/or external storage location using the program code interface 112. For example, the program code interface 112 is a universal serial bus interface, a network interface, a local hard disk, a compact disk drive, and the like.

Figure 2:
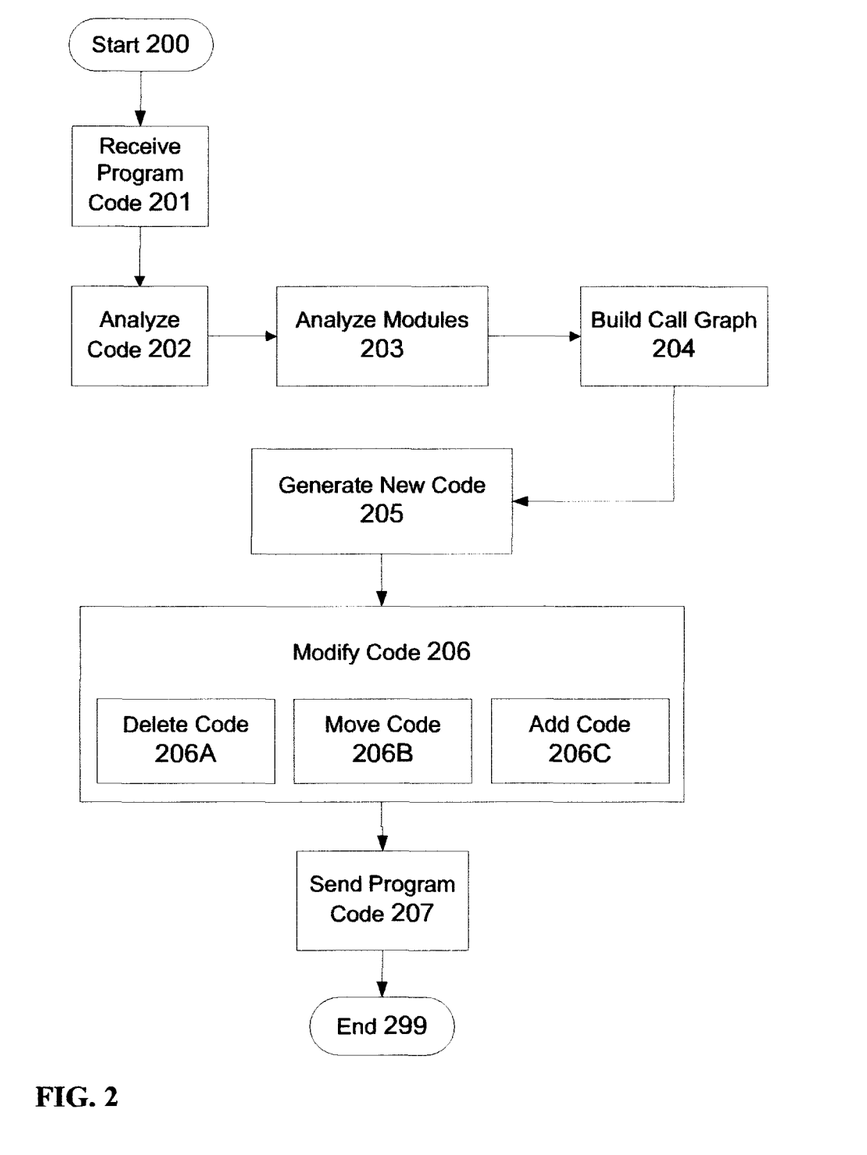
FIG. 2 is a flowchart of a method for analyzing and modifying a program code to decrease application execution time, according to some embodiments of the invention.

Reference is now made to FIG. 2, which is a flowchart of a method for analyzing and modifying a program code to decrease application execution time, according to some embodiments of the invention. The method starts 200 when the code analysis module 103 receives 201 a program code via a program code interface 112. The code is analyzed 202 using the code analysis module 103 of the processing unit 102 for determining the sequence of processor functions executed, such as a call graph 204, and the function calls to external modules that are loaded and/or imported. The code analysis module 103 further analyzes the execution point on the call graph when the user interaction is received from a user, such as the first user interaction screen, a login screen, a main menu screen, a data input screen, and the like. The code analysis module 103 marks the function calls, objects and variables, including internal and external resources, code, and/or the like directly used to display a user interaction screen in the call graph 204. Based on this marking, new code is generated 205 by the code generation module 104, which includes all the functions, objects, variables, and/or resources that are not part of this marked group. The new code is configured to execute these functions and/or loads these resources in the background while the application is waiting for user input. The program code is modified 206 using the code modification module 105 by deleting 206A the after-load resources and/or functions, moving 206B code, and adding 206C the new code generated 205 previously. The modified program code is sent 207 to the user and/or developer via the program code interface 112, ending 299 the actions of the method.

Following is an example of an algorithm executed by a processing unit 102 to implement embodiments of the invention on a JavaScript program code file. A mobile hybrid application with JavaScript program code located in a main HTML file "main.html" is received by a code analysis module 103 in a processing unit 102. The program code is analyzed by the code analysis module 103 to find all the imported code files, such as f1.js, . . . , fn.js. The program code is analyzed by the code analysis module 103 to find all the code fragments inside s1, . . . , sk. The imported files (f1, . . . , fn) and code fragments (s1, . . . , sk) are analyzed by the code analysis module 103 to find startup code fragments that are executed during load. A call graph is built by the code analysis module 103 of the startup code from the entry point. For every fi in f1, . . . , fn or sj in s1, . . . , sk split fi and sj into two resources by code generation module 104: each fi split to fi_startup and fi_after_load and each sj split to sj_startup and sj_after_load, where fi_startup and sj_startup contain only the code from fi and sj that is reachable from entry in the call graph to the user interaction screen and fi_after_load and sj_after_load contain the code from fi and sj that is not reachable from entry in the call graph to the user interaction screen. In "main.html" for every fi in f1, . . . , fn or sj in s1, . . . , sk the code modification module 105 replaces fi and sj with fi_startup and sj_startup. The code modification module 105 adds the following new script section generated by the code generation module 104 in "main.html":

```
<script type="text/javascript">
    document.onload=function( ){
        addScript("text/javascript","f1_after_load ");
        ...
        addScript("text/javascript","fn_after_load ");
        s1_after_load
        ...
        sn_after_load
    }
    function addScript(type,src){
        var s=document.createElement('script');
        s.setAttribute("type",type);
        s.setAttribute("src", src);
    }
</script>
```

Figure 3:
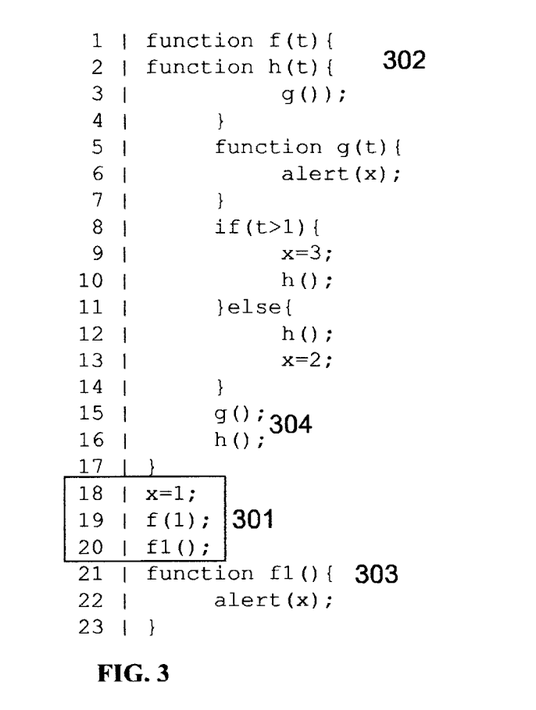
FIG. 3 is a text example of top level functions in a program code, according to some embodiments of the invention.

Reference is now made to FIG. 3, which is a text example of top level functions in a program code, according to some embodiments of the invention. The top level code 301 is listed on lines 18-20. The functions that are called from the top level are f(t) 302 and fl( ) 303 as these functions appear in lines 19 and 20. However functions g( ) and h( ) 304 are internal and cannot be called from the top level HTML code, hence a representation is not included for them in the call graph as these functions may not optimized. Notice that global functions in JavaScript may be called from the top level. Global functions are execution when an event occurs, such as when a user clicks a button, or they are executed from JavaScript code in the top level program code. JavaScript code may be executed directly from the program code or from imported JavaScript (js) code files without a function. Optionally, the code analysis module 103 uses the T. J. Watson Libraries for Analysis (WALA) tools to analyze the top level code and/or generate a call graph. The new function is generated by the code generation module 104 to represent the code that is not part of any top level executed code. For example, for the code in FIG. 3 has a new function a_js( ) that contains the code from lines 18-20. Optionally, the code generation module 104 generates new functions to represent JavaScript code inside HTML and/or js files based on the call graph analysis. For example, every JavaScript code is part of some new function. The code analysis module 103 builds a call graph that may represent a whole program, part of a program, part of a function, and the like. The first function of the top level code of a program code as an entry node in the call graph. For example, at the initial startup of an application, the first function call is the entry node and root node of the call graph, and the function call to display a user interaction screen is the optimization target node, or as used herein the target node, of the call graph which whose execution time is to be optimized. The code analysis module 103 identifies the code executed during loading by doing a depth first search and/or breadth first search on the call graph from the entry nodes. The nodes in the call graph that are not part of the graph between the entry node and the target node, and are not part of the branch connected to the target node, are nodes that represent functions to be executed in the background after the load event, and are used by the code generation module for generating the new code.

For example, a developer is writing a program code for an application with 10 user interaction screens (UIS). In this example, the developer has discovered that the execution time between screen 7 and screen 8 is greater than 20 seconds, and needs to be optimized for shorter execution time. In this example, the developer applied embodiments of the methods described herein, and marks the user input function for screen 7 as the entry node in the call graph, and the display function of screen 8 as the target node. By analyzing the path from the entry node to the target node, and modifying the program code to execute the unreachable code (represented as unreachable nodes in the call graph) in the background after the target node is executed, the execution time between screen 7 and screen 8 is decreased.

Figure 4A:
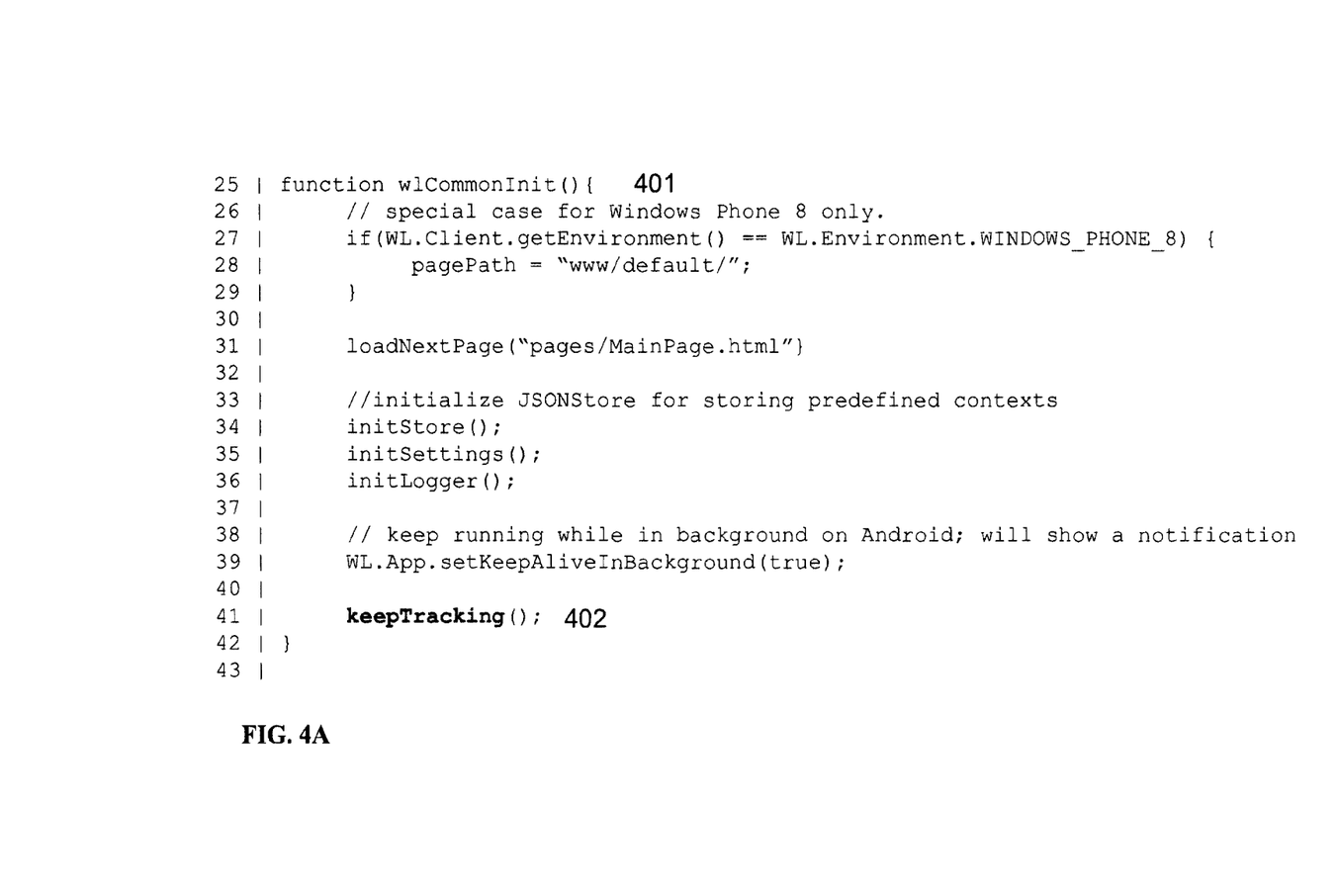
FIG. 4A is a text example of program code for generating a call graph, according to some embodiments of the invention.
Figure 4B:
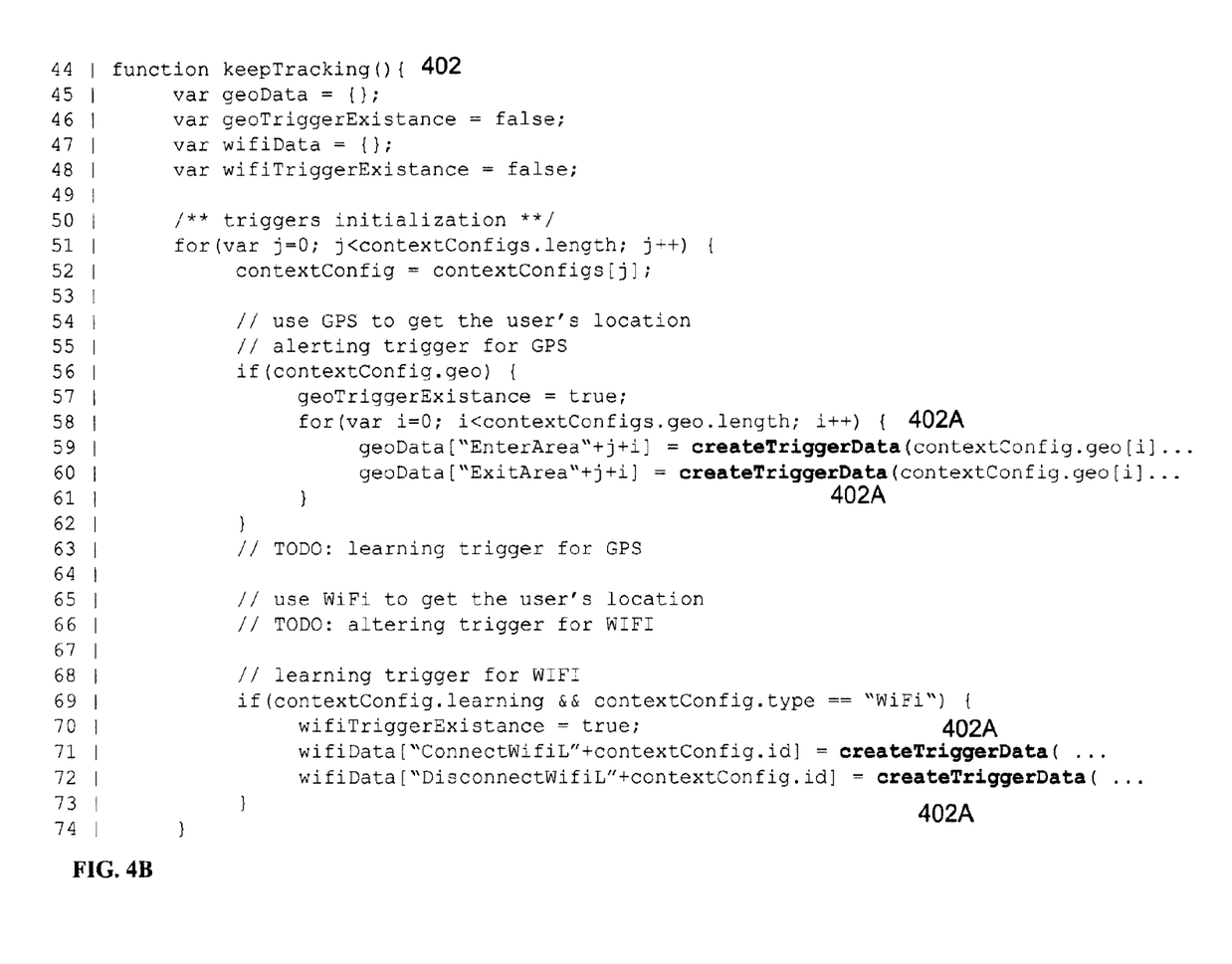
FIG. 4B is a further text example of program code in FIG. 4A for generating a call graph, according to some embodiments of the invention.
Figure 4C:
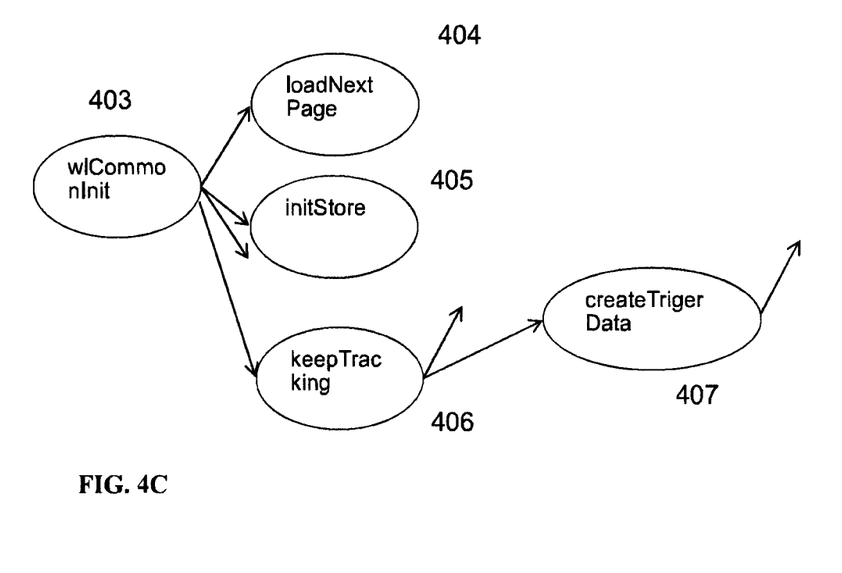
FIG. 4C is a schematic illustration of a partial call graph generated from the program code of FIG. 4A and FIG. 4B, according to some embodiments of the invention.

A call graph of a program code is the mapping of functions and function dependencies. Following is an example of building a call graph by the code analysis module 103 from a program code. Reference is now made to FIG. 4A, which is a text example of program code to generate a call graph, according to some embodiments of the invention. In the example code, the function wlCommonInit( ) 401 is called from the top level, and the code for the function keepTracking( ) 402 code is shown in FIG. 4B. Reference is now made to FIG. 4B, which is a further text example of program code in FIG. 4A to generate a call graph, according to some embodiments of the invention. The function keepTracking( ) 402 contains four calls to function createTriggerData( ) 402A. The call graph for this portion of the top level code is shown in FIG. 4C. Reference is now made to FIG. 4C, which is a schematic illustration of a partial call graph generated from the program code of FIG. 4A and FIG. 4B, according to some embodiments of the invention. The function wlCommonInit( ) 401 is shown as the root node 403 of the partial call graph, and the function keepTracking( ) 402 is shown as a node as at 406 connected to the root node 403. Other functions loadNextPage( ) is a node at 404 and initStore( ) is a node at 405, both also connected to the root node 403. The function createTriggerData( ) 402A is shown as a node at 407 connected to the node 406 for the function keepTracking( ) 402. To optimize the execution time of the function keepTracking( ) 402 when the function wlCommonInit( ) 401 is executed, the functions represented by nodes not on the path between 403 and 406, and not on the branch of the call graph starting at 406, will be executing in the background after keepTracking( ) 402 has completed execution.

Optionally, the entry node is any node in the call graph. For example, a mobile application developer has used a profiling tool to determine that a portion of a program code under development has requires a long execution time between function a( ) and function b( ). In this example the developer would use embodiments of the invention to optimize the program code between these two functions and improve the execution time. Optionally, the target node is any node in the call graph that is executed after the entry node. For example, the call graph represents the function execution from the left side of the call graph to the right side, and the entry node is to the left of the target node. For example, the call graph contains recursive function execution and the entry node is to the right of the target node.

Optionally, an imported code file is split into two imported code files by the code generation module 104, the first code file containing functions to be executed before the user interaction screen, and the second code file for containing functions to be executed after the user interaction screen in the background during user interaction. For example, a command to import a file "js/somefile.js" is coded as: <script type="text/javascript" src="js/somefile.js"></script> and the file "js/somefile.js" is split into two files "js/somefilebeforeload.js" and "js/somefileafterload.js". The new file "somefilebeforeload.js" generated by the code generation module 104 contains the code from "somefile.js" that is executed before the user interaction screen and "somefileafterload.js" generated by the code generation module 104 contains the code from "somefile.js" that is executed after the user interaction screen. The code modification module 105 removes the command <script type="text/javascript" src="js/somefile.js"></script> from the program code and adds the following code to the program code:

```
<script type="text/javascript" src=7s/somefilebefore-
    load.js"></script>
<script type="text/javascript">
    document.onload=function( ){
        addScript("text/javascript","js/ somefileafterloadjs");
    }
    function addScript(type,src){
        var s=document.createElement('script');
        s.setAttribute("type", type);
        s.setAttribute("src", src);
    }
</script>
```

Following are examples of implementing some embodiments of the invention on a JavaScript (js) program code.

Figure 5A:
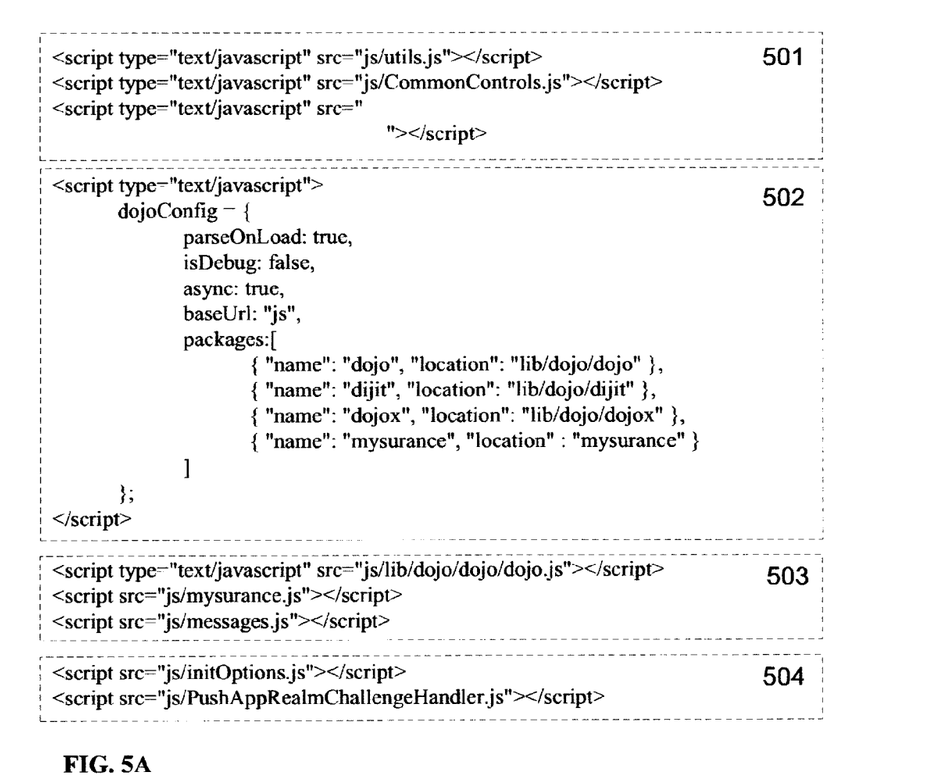
FIG. 5A is a text example of a first part of a program code of a mobile hybrid application before decreasing application execution time, according to some embodiments of the invention.
Figure 5B:
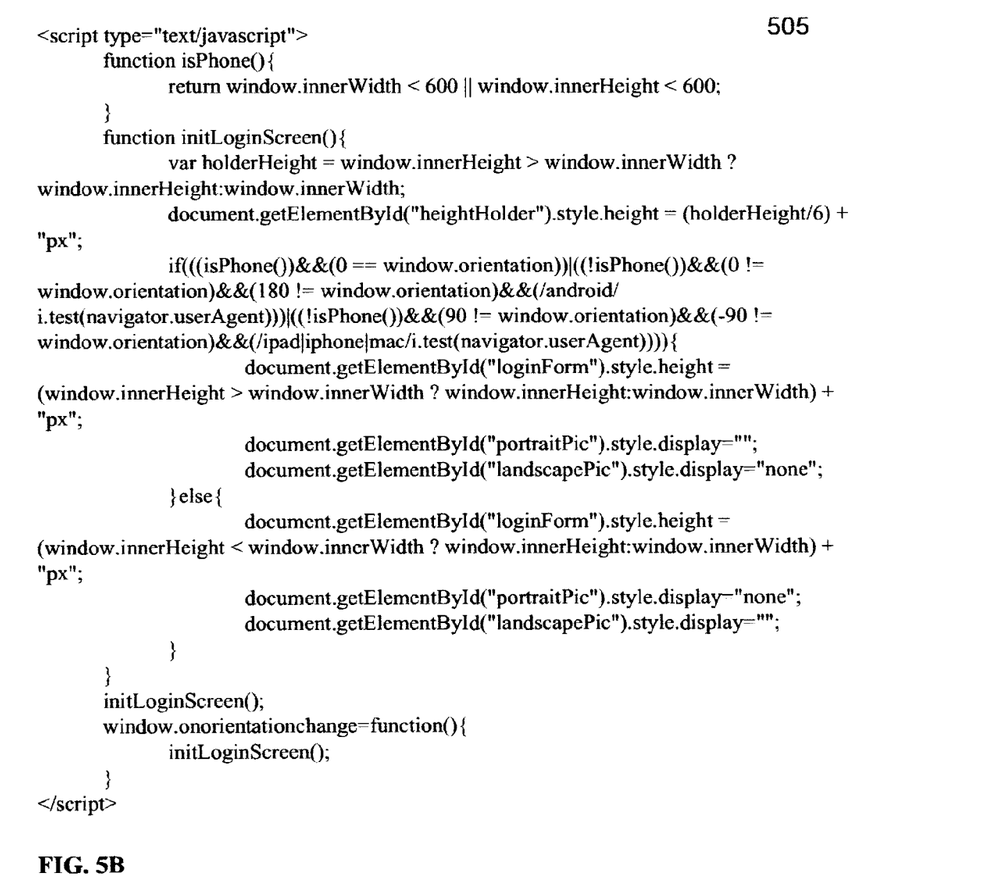
FIG. 5B is a text example of a second part of the program code in FIG. 5A, according to some embodiments of the invention.
Figure 5C:
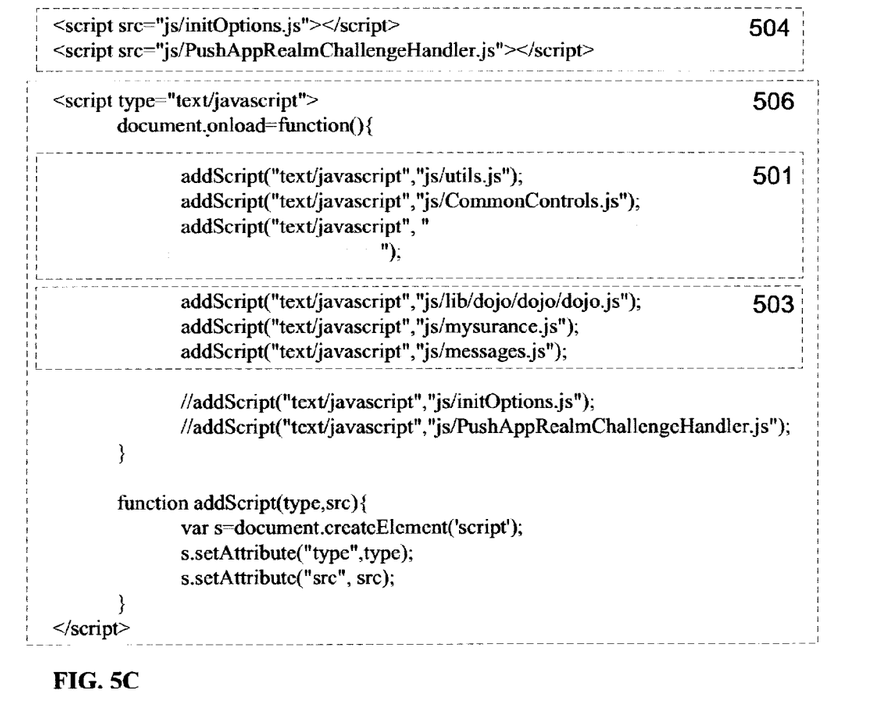
FIG. 5C is a text example of the modified program code of FIG. 5A after decreasing application execution time, according to some embodiments of the invention.

Reference is now made to FIG. 5A, which is a text example of a first part of a program code of a mobile hybrid application before decreasing application execution time, according to some embodiments of the invention. The program code of this example contains a first code fragment 501 for js code file import, initial data configuration code 502, a second code fragment 503 for js code file import, and a third code fragment 504 for js code file import. Reference is now made to FIG. 5B, which is a text example of a second part of the program code in FIG. 5A, according to some embodiments of the invention. This second part of the example contains js code for initializing and displaying the first user interaction screen. After analysis by the code analysis module 103, the code fragments of FIG. 5A are transformed to the code in FIG. 5C by the code generation module 104. Reference is now made to FIG. 5C, which is a text example of the modified program code of FIG. 5A after improvement of user experience, according to some embodiments of the invention. The analysis by the code analysis module 103 determined that the third code fragment 504 was the only code needed for displaying the first user interaction screen, and the code modification module 105 moved this fragment to the beginning of the program code as at 504 in FIG. 5C. The first 501 and second 503 code fragments were moved by the code modification module 105 into a new code fragment 506, which is executed in the background after the first user interaction screen is loaded, as at 501 and 503. Performing this program code analysis, generation and modification by the processing unit 102 gave a 30% improvement in loading time of the first user interaction screen over the original program code.

Figure 6:
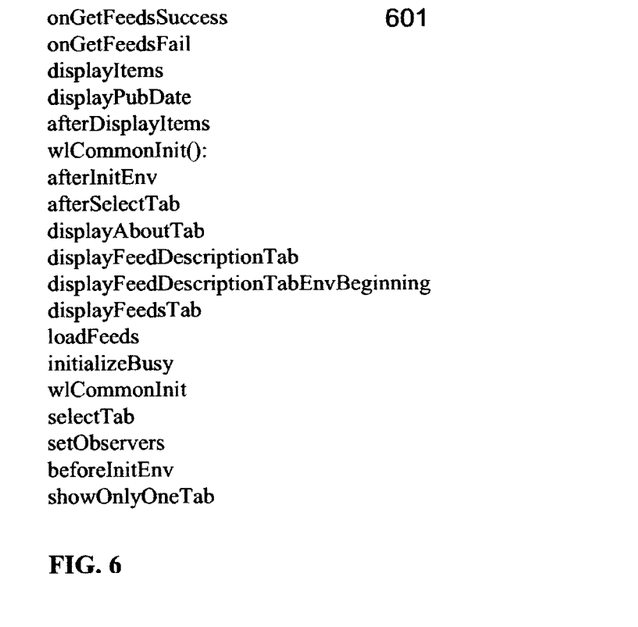
FIG. 6 is a list of JavaScript functions not used before the display of a user interaction screen, according to some embodiments of the invention.
Figure 7:
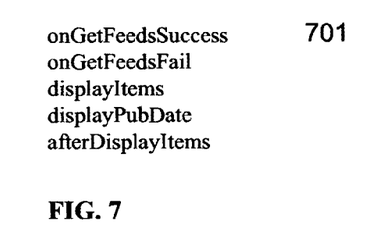
FIG. 7 is a list of functions not used before the display of a user interaction screen, according to some embodiments of the invention.

In a second program code example, the analysis by the code analysis module 103 determined that many functions and js functions were not required for execution of a user interaction screen. Reference is now made to FIG. 6, which is a list of JavaScript functions 601 not used before the display of a user interaction screen, according to some embodiments of the invention. Reference is now made to FIG. 7, which is a list of functions 701 not used before the display of a user interaction screen, according to some embodiments of the invention. In this example, the functions 701 and js function 601 may be loaded in background after the user interaction screen to improve the execution time for loading the user interaction screen.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computer programming languages will be developed and the scope of the term program code and/or code is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for changing a program code to decrease execution time, comprising:
   receiving a program code, wherein said program code comprises a plurality of function calls, wherein one of said plurality of function calls is an entry function, wherein one of said plurality of function calls is a target function, and wherein an execution time between said entry function and said target function is to be decreased;
   analyzing said plurality of function calls between said entry function and said target function;
   generating a first program code comprising some of said plurality of function calls executed before said target function;
   generating a second program code comprising some of said plurality of function calls executed after said target function;
   replacing said plurality of function calls executed before said target function with said first program code;
   removing said plurality of function calls executed after said target function; and
   adding said second program code to said program code at a location within said program code configured to execute said second program code after said target function as a background process.

2. The method of claim 1, wherein said analysis is performed by generating a call graph of said plurality of function calls, wherein said call graph comprises a plurality of nodes, one for each of said plurality of function calls.

3. The method of claim 2, wherein one of said a plurality of nodes is an entry node representing said entry function, and one of said a plurality of nodes is a target node representing said target function, and a path between said entry node and said target node is analyzed to select some of said plurality of nodes representing some of said plurality of function calls that are required for execution of a target function.

4. The method of claim 3, wherein said analysis of said path and a branch of said call graph starting at said target node are used to generate said first and second program code.

5. The method of claim 4, wherein said path and said branch is determined by a graph theory reachability of said call graph between said entry node and said target node.

6. The method of claim 1, wherein said target function is a function adapted to send at least one output value to a user interface.

7. The method of claim 6, wherein said at least one output value is adapted to display a user interaction screen.

8. The method of claim 1, wherein said target function is a function adapted to receive at least one input value from a user interface.

9. The method of claim 1, wherein some of said plurality of function calls are located in at least one external library comprising a plurality of library function calls, wherein said at least one external library is an external file to said program code.

10. The method of claim 1, wherein some of said plurality of function calls are located in at least one external program code file different from said program code, herein said external program code file is located at a separate file storage location from said program file.

11. The method of claim 10, wherein said at least one external program code file is modified to generate a first external program code file containing code executed before said target function and a second external program code file containing code executed after said target function, wherein said first program code is adapted to import said first external program code file from said separate file storage location before said target function is executed and said second program code is adapted to import said second external program code file from said separate file storage location after said target function is executed.

12. The method of claim 1, wherein said program code, said first program code, and said second program code are a compiled language code and compiled to produce said application prior to execution on a mobile device by a user.

13. The method of claim 1, wherein said program code, said first program code, and said second program code are at least one programming language from the group of a script language code, a markup language code, an interpreted language code and a style sheet language code.

14. The method of claim 13, wherein said script language code is a JavaScript language code.

15. The method of claim 13, wherein said markup language code is a hypertext markup language code.

16. The method of claim 13, wherein said at least one programming language is a plurality of computer programming languages.

17. A non-transitory computer readable medium comprising computer executable instructions adapted to perform the method of claim 1.

18. A computer program product for changing a program code to decrease execution time, said computer program product comprising:
a computer readable storage medium having stored thereon:
first program instructions executable by a computerized system to cause said computerized system to receive a program code, wherein said program code comprises a plurality of function calls, wherein one of said plurality of function calls is an entry function, wherein one of said plurality of function calls is a target function, and wherein an execution time between said entry function and said target function is to be decreased;
second program instructions executable by said computerized system to cause said computerized system to analyze said plurality of function calls between said entry function and said target function;
third program instructions executable by said computerized system to cause said computerized system to generate a program code comprising some of said plurality of function calls executed before said target function;
fourth program instructions executable by said computerized system to cause said computerized system to generate a second program code comprising some of said plurality of function calls executed after said target function;
fifth program instructions executable by said computerized system to cause said computerized system to replace said plurality of function calls executed before said target function with said first program code;
sixth program instructions executable by said computerized system to cause said computerized system to remove said plurality of function calls executed after said target function; and
seventh program instructions executable by said computerized system to cause said computerized system to add said second program code to said program code at a location within said program code configured to execute said second program code after said target function as a background process.

19. A system for changing a program code to improve execution time, comprising:
at least one processing unit;
a user interface to control the operation of at least one computerized device of said system;
a program code interface to transfer a program code to said at least one processing unit;
a non-transitory computer readable medium comprising computer executable instructions executable by said at least one processing unit, comprising:
instructions to receive, by a code analysis module, said program code via said program code interface, wherein said program code comprises a plurality of function calls, wherein said plurality of function calls comprise an entry function and a target function, and wherein said plurality of function calls are analyzed between said entry function and said target function;
instructions to generate, by a code generation module, a first program code comprising some of said plurality of function calls executed before said target function and configured to generate a second program code comprising some of said plurality of function calls executed after said target function;
instructions to modify, by a code modification module, said plurality of function calls with said first and second program code, wherein said modification is adapted to execute said second program code in a background process after said target function.

20. The system of claim 19, wherein said program code interface is a network interface electronically attached to said at least one processing unit.

* * * * *